United States Patent
Sullivan et al.

(10) Patent No.: US 11,418,398 B1
(45) Date of Patent: Aug. 16, 2022

(54) AUTOMATED DISCOVERY AND CONFIGURATION TECHNIQUES

(71) Applicant: ROCKWELL AUTOMATION TECHNOLOGIES, INC., Mayfield Heights, OH (US)

(72) Inventors: Cassiopia H. Sullivan, Clinton, MA (US); Michael Chemello, San Giovanni in Persiceto (IT); Jesse R. Mendenhall, Brookline, NH (US); Brian Perreault, Stow, MA (US); Tracy Clark, Devens, MA (US); Neil Bentley, Mayfield Heights, OH (US); Yuhong Huang, Acton, MA (US); Sergio L. Canales, Barcelona (ES); Jesus Chung, Marlborough, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/223,806

(22) Filed: Apr. 6, 2021

(51) Int. Cl.
*H04L 41/08* (2022.01)
*H04L 41/12* (2022.01)
*G05B 19/418* (2006.01)
*H04L 61/5007* (2022.01)
*H04L 101/622* (2022.01)

(52) U.S. Cl.
CPC .... *H04L 41/0876* (2013.01); *G05B 19/41835* (2013.01); *H04L 41/12* (2013.01); *H04L 61/2007* (2013.01); *G05B 2219/31368* (2013.01); *H04L 61/6022* (2013.01)

(58) Field of Classification Search
CPC . H04L 41/0876; H04L 41/12; H04L 61/2007; H04L 61/602; G05B 19/41835; G05B 2219/31368
See application file for complete search history.

(56) References Cited

U.S. PATENT DOCUMENTS

| | | | |
|---|---|---|---|
| 2015/0100674 A1* | 4/2015 | Chiche | H04L 41/0806 709/222 |
| 2015/0344233 A1* | 12/2015 | Kleinikkink | G05B 19/414 700/230 |
| 2016/0173342 A1* | 6/2016 | Latham | H04L 41/145 715/735 |
| 2018/0262464 A1* | 9/2018 | Pan | H04L 61/2038 |
| 2019/0061558 A1* | 2/2019 | Craver | H02K 11/215 |
| 2020/0162285 A1* | 5/2020 | Drury | F24F 11/58 |
| 2021/0048786 A1* | 2/2021 | Mast | G05B 19/042 |
| 2021/0249943 A1* | 8/2021 | Yamamoto | B65G 54/02 |
| 2021/0328874 A1* | 10/2021 | Jacobson | H04L 41/12 |

* cited by examiner

*Primary Examiner* — Tonia L Dollinger
*Assistant Examiner* — Joseph M Cousins
(74) *Attorney, Agent, or Firm* — Fletcher Yoder P.C.

(57) ABSTRACT

A method may include receiving topology information associated with a linear motor system that includes multiple track modules. Each track module may include one or more motors. The topology information may include one or more media access control (MAC) addresses associated with the motors. The method may also include associating one or more IP addresses with the MAC addresses associated with the motors, generating a configuration file associated with the linear motor system based on the topology information and the IP addresses, and transmitting one or more commands to the motors to control or adjust one or more operations of the motors based on the configuration file.

20 Claims, 8 Drawing Sheets

AUTOMATED DISCOVERY AND CONFIGURATION TECHNIQUES

BACKGROUND

This disclosure relates generally to systems and methods for automating discovery and configuration of industrial automation devices. More particular, embodiments of the present disclosure are directed toward automating discovery of industrial automation devices in a linear motor system over a network and mapping respective network communication attributes of the industrial automation devices to a topology of the industrial automation devices in the linear motor system.

Linear motor systems are used in various industries, such as manufacturing, filling, packaging, and material handling applications. For example, a linear motor system may include various industrial automation devices (e.g., track modules and corresponding motors) arranged and connected in a particular topology in which moving components (e.g., a mover, a vehicle, or a puck) are positioned, accelerated, decelerated, and generally moved under the influence of controlled magnetic and electromagnetic fields. In such systems, a control system may coordinate the operation of the industrial automation devices in the linear motor system via wired or wireless communication networks. Thus, it may be useful to improve techniques for automatically discovering the industrial automation devices in the linear motor system and mapping or associating network communication attributes of the discovered industrial automation devices to the topology of the industrial automation devices in the linear motor system to improve an efficiency in configuring, controlling, and operating the industrial automation devices.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a non-transitory, computer-readable medium including computer-executable code that, when executed by at least one processor, causes the processor to perform operations that include receiving topology information associated with a linear motor system. The linear motor system may include multiple track modules that each include one or more motors. The operations may also include automatically populating a configuration file with one or more attribute fields with one or more respective attributes associated with each motor based on the topology information. The respective attributes associated with each motor may include an identifier associated with a respective motor. The operations may also include associating one or more communication attributes of the motors with one or more respective identifiers, automatically populating the configuration file with the respective communication attribute fields associated with the motors based on the communication attributes, and transmitting one or more commands to the motors to control one or more respective operations based on the configuration file.

In another embodiment, a method may include receiving topology information associated with a linear motor system that includes multiple track modules. Each track module may include one or more motors. The topology information may include one or more media access control (MAC) addresses associated with the motors. The method may also include associating one or more internet protocol (IP) addresses with the MAC addresses associated with the motors, generating a configuration file associated with the linear motor system based on the topology information and the IP addresses, and transmitting one or more commands to the motors to control or adjust one or more operations of the motors based on the configuration file.

In yet another embodiment, a non-transitory, computer-readable medium including computer-executable code that, when executed by at least one processor, causes the processor to perform operations that include receiving, from a computing device, topology information associated with a linear motor system. The linear motor system may include multiple track modules that each include one or more motors. The operations may also include automatically populating a configuration file with one or more respective attribute associated with each motor based on the topology information. The respective attributes associated with each motor may include a media access control (MAC) address. The operations may also include associating an IP address of each motor with the MAC address associated with each motor, automatically populating the configuration file with the IP addresses associated with the motors, and transmitting one or more commands to the motors to control one or more respective operations based on the configuration file.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
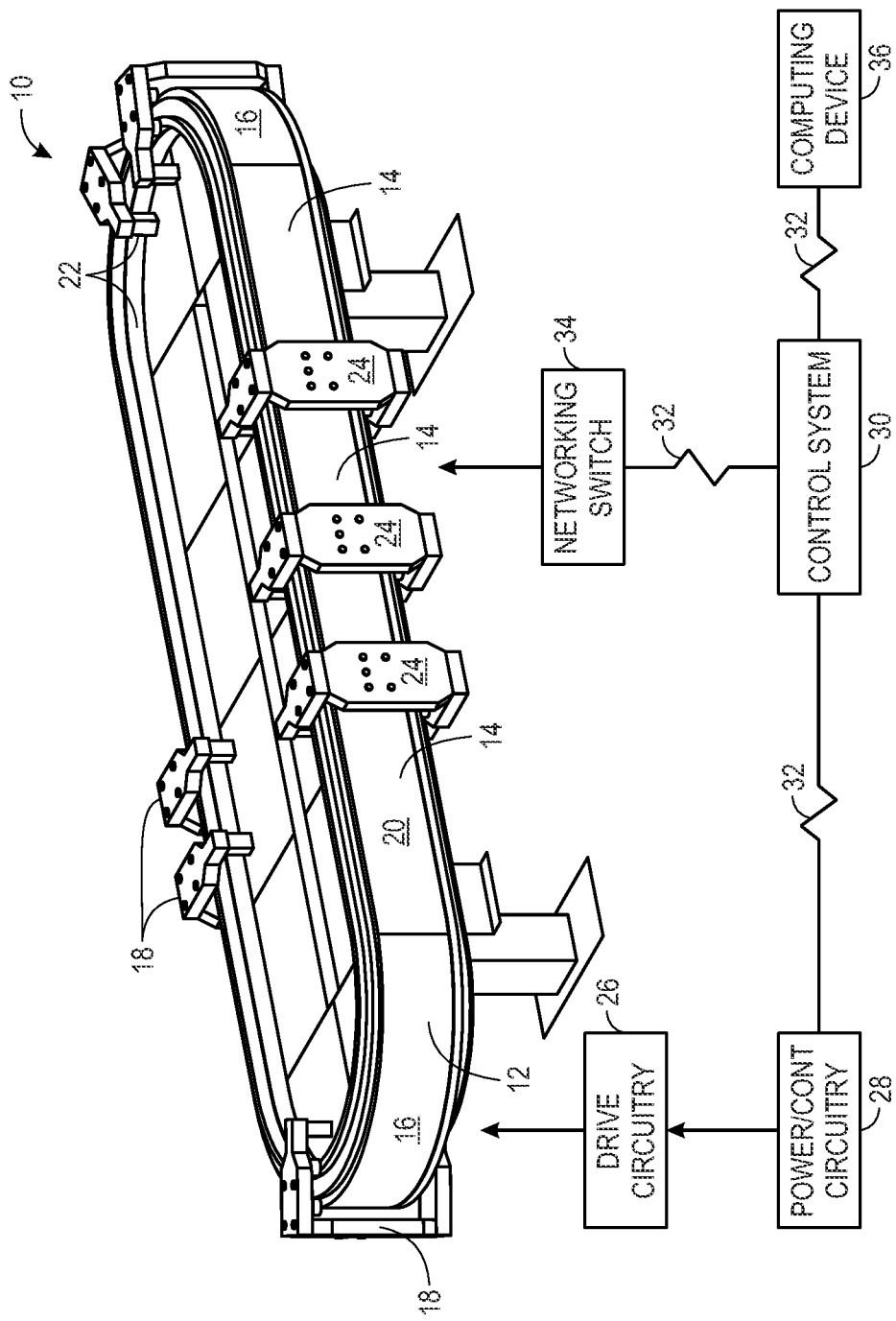
FIG. 1 illustrates a perspective view of an exemplary industrial automation system including a linear motor system, in accordance with an embodiment.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed towards techniques for automatically discovering industrial automation devices in a linear motor system over a communication network (e.g., Ethernet) and mapping or associating network communication attributes of the discovered industrial automation devices to a topology of the industrial automation devices in the linear motor system. For example, a linear motor system may include various industrial automation devices (e.g., track modules and corresponding linear motors) arranged and connected in a particular topology to perform an associated operation. During operation of the linear motor system, a control system may coordinate the operation of the industrial automation devices in the linear motor system via the communication network to move components of the linear motor system along a path provided by the linear motor system. For example, moving components (e.g., movers, vehicles, or pucks) of the linear motor system may be positioned, accelerated, decelerated, and generally moved under the influence of controlled magnetic and electromagnetic fields.

In order to coordinate the operation of the industrial automation devices of the linear motor system over the communication network, the control system may generate a configuration file that includes various attributes of the industrial automation devices and may subsequently send commands to the industrial automation devices to control operation of the industrial automation devices based on the configuration file. For example, the configuration file may include attributes that identify each motor of each track module in the linear motor system, a relative location of each motor in the linear motor system with respect to other motors, an orientation of each track module associated with each motor in the linear motor system, a media access control (MAC) address of each motor in the linear motor system, an internet protocol (IP) address associated with each motor in the linear motor system, and the like. However, the control system may not be able to automatically determine such attributes of the linear motor system using the communication network. Thus, an operator may have to manually enter the information into the control system or other suitable computing system for each attribute of each track module and corresponding motor to generate the configuration file. Since linear motor systems may include hundreds or thousands of motors, manual entry of such information to generate corresponding configuration files may be time-intensive and incur a risk of potential error in submission of the information.

Accordingly, embodiments of the present disclosure are directed toward automatically discovering industrial automation devices (e.g., track modules and corresponding motors) in a linear motor system and mapping or associating one or more communication attributes of the discovered industrial automation devices to a topology of the industrial automation devices in the linear motor system. For example, an operator may use a commissioning tool graphical user interface (GUI) provided by a control system to automatically generate a configuration file associated with a linear motor system. The operator may submit topology information of the linear motor system to the control system via the commissioning tool GUI. After receiving the topology information, the control system may automatically populate respective fields of the commissioning tool GUI with corresponding attributes of track modules and corresponding motors of the linear motor system. For example, the populated fields may include an identifier of each motor in the linear motor system, a location of each motor in the linear motor system, an orientation of each track module associated with each motor in the linear motor system, and the like.

After the control system populates the fields of the commissioning tool GUI based on the received topology information, the control system may map or associate one or more communication attributes of each motor in the linear motor system with the corresponding identifier of the motor in the linear motor system. For example, the control system may map or associate an IP address of each motor to the MAC address of each motor. In certain embodiments, the control system may map the IP address of each motor to the MAC address of each motor by prompting the operator to manually scan the MAC address of each motor via a mobile device one at a time. In response to receiving a respective MAC address for a motor from the mobile device, the control system may assign an IP address to the motor and automatically populate the respective IP address field for the motor in the commissioning tool GUI.

In other embodiments, after the linear motor system has powered on, the control system may assign a temporary IP address to each track module in the linear motor system. The control system may then transmit signals to the track modules or receive signals from the track modules to map or associate IP addresses to be assigned to each motor associated with the track modules to the MAC addresses of each motor. For example, the control system may prompt the operator to manually move a mover (e.g., a vehicle or a puck) over each motor and corresponding track module in the linear motor system, or the control system may automatically drive the mover over each motor and corresponding track module in the linear motor system. As the mover traverses a motor, the motor of the respective track module may receive a magnetic field generated from a corresponding magnet array of the mover. The control system may then receive a signal from a magnetic field sensor of the track module associated with the traversed motor and automatically assign an IP address to the traversed motor, thereby populating the respective IP address field for the traversed motor in the commissioning tool GUI. Alternatively, the control system may selectively energize respective sets of coils of each track module of the linear motor system, one at a time, to generate a magnetic field at each track module without use of the mover. After a particular set of coils is energized, a sensor of a neighboring track piece may detect the generated magnetic field and transmit a signal to the control system indicative of the detected magnetic field. Based on the received signal, the control system may then assign an IP address to a motor associated with the neighboring track piece, thereby populating the respective IP address field for the motor in the commissioning tool GUI. The control system may then repeat this process at adjacent sets of motors (e.g., coils) until IP addresses are assigned to each motor in the linear motor system.

After each motor in the linear motor system has been assigned an IP address, the control system may then optionally prompt the operator to submit orientation information for motors in respective fields in the commissioning tool GUI that were not automatically populated based on the received topology information. For instance, certain types of motors and their corresponding track modules may have different orientations based on the path formed by the track modules in the linear motor system. Based on a direction of movement of a mover over a motor of a particular track piece, a straight track piece or a curved track piece may have a "standard" orientation or a "reversed" orientation in the linear motor system. In some embodiments, the control system may automatically detect the orientation of the track modules via various detection processes of the magnetic fields as described herein. After the operator has optionally submitted the orientation information in the commissioning tool GUI for any remaining track modules and corresponding motors, the control system may generate the configuration file based on the attributes populated in each set of fields in the commissioning tool GUI for each motor. Thereafter, the control system may utilize the configuration file to control operation of one or more industrial automation devices of the linear motor system. In this way, generation of the configuration file via the commissioning tool GUI may reduce the risk of potential error that may be incurred from an operator manually entering the corresponding information into the commissioning tool GUI and reduce an amount of effort that would otherwise be spent by the operator to manually enter the information. Additional details related to the above-described embodiment, as well as other embodiments for automatically generating the configuration file, will be discussed below with reference to FIGS. 1-8.

With the foregoing in mind, FIG. 1 illustrates a linear motor system 10 that may move articles or products around a track 12. As will be appreciated by those skilled in the art, in many applications, the linear motor systems 10 may operate with other machines, robots, conveyers, control equipment, and so forth (not shown) in an overall automation application, packaging application, material handling application, or other type of application. The linear motor system 10 itself may generally include a "linear motor" as discussed below, in which moving components may be positioned, accelerated, decelerated, and generally moved under the influence of controlled magnetic and electromagnetic fields. In the illustrated embodiment, the track 12 may include straight track modules 14 (i.e., and their respective motors) and curved track modules 16 (i.e., and their respective motors). These modules may be generally self-contained and mountable in various physical configurations, such as the oval shape illustrated in FIG. 1. It should be noted that other configurations are equally possible as discussed below. The configuration may form closed loops of various shapes but may also include open-ended segments and/or diverter tracks, such as diversion tracks or rotary tracks (e.g., tracks that rotate).

The linear motor system 10 may also include one or more movers 18 (e.g., vehicles or pucks) mounted to and movable along the track 12. Control parameters, such as position, velocity, acceleration, and higher order derivative parameters, are controllable for these movers 18 by appropriate control of respective coils of respective motors of the track modules 14, 16 of the linear motor system 10 that are energized and de-energized to implement particular control parameter values. In the illustrated embodiment, the movers 18 interact with stationary elements in and around an outer periphery 20 of the track 12, although other configurations may be envisaged. A sensor system 22 is provided to detect positions of the movers 18 around the track 12. Such sensor systems 22 may include permanent magnets, energized coils, Hall Effect sensors, image sensors, radio-frequency identification (RFID) sensors, or any other suitable devices to perform such detection. In general, each mover 18 may include a first component of the sensor system 22, and each track module 14, 16 may include a second component of the sensor system 22. As mentioned above, in one example, the second component of the sensor system 22 may detect a magnetic field generated by the movers 18 as the movers 18 traverse the respective motors of the track modules 14, 16.

Each mover 18 may include a mounting platform 24. In an actual implementation, various tools, holders, support structures, loads, and so forth may be mounted to the mounting platform 24. The movers 18 themselves may be different from those shown, such as to accommodate various loads. While a horizontal configuration is illustrated in FIG. 1, other orientations may also be provided, such as ones in which the illustrated oval shape is generally stood on a side or end, or at any angle between. For example, one or more movers 18 may be suspended from the track and/or may float above the track.

The linear motor system 10 may further include circuitry for controlling a movement of the movers 18. As illustrated in FIG. 1, the circuitry may include drive circuitry 26 that may provide signals to each track module 14, 16, and individual coils (see below) of the motors of the track modules 14, 16 to create electromotive forces that may interact with magnets on the track modules 14, 16 to drive the movers 18 to specific locations, and at specific velocity, accelerations, and so forth (e.g., to move along a surface of the track 12). The drive circuitry 26 may include inverter circuitry that makes use of power electronic switches to provide drive power to the individual coils of each module in a controller manner. In some cases, the drive circuitry 26 may be included in each individual track module 14, 16, and/or mover 18, and the signals may be provided to the drive circuitry 26 by power and control circuitry 28. The power and control circuitry 28 (and the drive circuitry 26) may receive feedback from the movers 18 and/or from the sensor system 22 to detect the location, velocity, acceleration, and so forth of each mover 18. In certain embodiments, the movers 18 may also be recognized by the power and control circuitry 28 as associated with individual axes of motions that are independently controlled but regulated with respect to their position, velocity, and acceleration to avoid conflicts, collisions, and so forth. The regulation of their position, velocity, and acceleration may be maintained as part of a coordinated motion and/or coordinated industrial automation operation. The particular motion profile implemented by the power and control circuitry 28 may be implemented upon the design and commissioning of the linear motor system 10 depending upon the particular task to be performed.

Further, various remote control and/or monitoring circuitry (e.g., control system 30) may link to the linear motor system 10 via one or more communication networks 32 (e.g., Ethernet). For example, each motor of each track module 14, 16 may communicate with the control system 30 over the communication network 32 via a network switch 34. Additionally, each motor of each track module 14, 16 may communicate with each motor of a neighboring track module 14, 16 via the communication network 32. As described herein, a "neighboring track module" may refer to a track module 14, 16 directly connected to a respective track module 14, 16 in a downstream direction or an upstream direction with respect to the track 12 of the linear motor system 10. For instance, the communication network 32 may be implemented as a wired communication network or a wireless communication network, such as a local area network (LAN), a wide area network (WAN), and the like. Additional details regarding the communication between each track module 14, 16 and corresponding motors, the network switch 34, and the control system 30 via the communication network 32 are described in more detail with reference to FIG. 2.

The control system 30 may generally coordinate operation of the linear motor system 10 with other automation components, machine systems, manufacturing and material handling machines, and so forth. As mentioned above, the control system 30 may automatically generate a configuration file associated with the linear motor system 10 in accordance with one or more embodiments described herein. For example, the control system 30 may generate and transmit a commissioning tool GUI to one or more computing devices 36 (e.g., a laptop, a desktop, or a mobile device) via the communication network 32. Additional details regarding the commissioning tool GUI are described in more detail with reference to FIGS. 4-9.

The control system 30 may receive topological information and/or orientation information associated with each motor of each track module 14, 16 of the linear motor system 10 from the computing devices 36 via the commissioning tool GUI. In some embodiments, the topological information may include an identifier of each motor of each track module 14, 16 in the linear motor system 10, a location of each motor of each track module 14, 16 in the linear motor system 10, and an orientation of each track module 14, 16 associated with each motor in the linear motor system 10. In certain instances, the topology information received by the control system 30 may not include the orientation for some or each of the track modules 14, 16 associated with each motor in the linear motor system 10. In such instances, the orientation information may also be received from the computing devices 36 via the commissioning tool GUI for one or more track modules 14, 16 and corresponding motors. Additional details regarding the orientation of each track module 14, 16 and corresponding motor in the linear motor system 10 are described in more detail with reference to FIG. 2.

The control system 30 may map or associate one or more communication attributes (e.g., an IP address) of a motor of a track module 14, 16 in the linear motor system 10 to a unique network identifier (e.g., a MAC address) of the motor of the track module 14, 16 in the commissioning tool GUI. In certain embodiments, the control system 30 may receive a representation of a MAC address from the computing device 36 or a scanning device (not shown) for a particular motor of a track module 14, 16 in the linear motor system 10. For instance, the representation of the MAC address for the motor of the track module 14, 16 may be manually scanned or captured by an operator via the computing device 36 (e.g., via a camera) or the scanning device (e.g., a barcode scanner or a quick response (QR) code scanner). The control system 30 may then map or associate an IP address to the MAC address of the motor of the track module 14, 16 based on the received representation of the MAC address. Additional details regarding manually scanning or capturing the MAC address of a motor of a track module 14, 16 and subsequent association of an IP address to the MAC address of the motor are described in more detail with reference to FIGS. 5, 6, 7A, and 7B.

In other embodiments, the control system 30 may transmit signals to the linear motor system 10 or receive signals from the linear motor system 10 via the communication network 32 and the network switch 34 to map or associate IP addresses to the respective MAC addresses of motors of the track modules 14, 16. For instance, the control system 30 may leverage detection of a magnetic field at a set of coils of a motor of a track module 14, 16 to map or associate an IP address to the MAC address of the motor of a track module 14, 16. In one embodiment, an operator may move a mover 18 over each motor of each track module 14, 16. As the mover 18 traverses the motor of the track module 14, 16, a magnetic field sensor of the sensor system 22 may detect a magnetic field generated by the mover 18 and transmit a signal indicative of the detected magnetic field to the control system 30. The control system 30 may then map or associate an IP address to the MAC address of the traversed motor of the track module 14, 16.

In another embodiment, the control system 30 may automatically drive the mover 18 over each motor of each track module 14, 16 via the drive circuitry 26 and the power and control circuitry 28. After a magnetic field sensor of the sensor system 22 detects the magnetic field generated by the by the mover 18, the magnetic field sensor of the sensor system 22 may transmit a signal indicative of the detected magnetic field to the control system 30. The control system 30 may then map or associate an IP address to the MAC address of the traversed motor of the track module 14, 16.

In yet another embodiment, the control system 30 may send a command signal to respective coils of the motor of the track module 14, 16 to selectively and/or independently energize the coils of the motor to generate a magnetic field. The magnetic field sensor of the sensor system 22 at a neighboring track module 14, 16 may detect the generated magnetic field and transmit a signal indicative of the detected magnetic field to the control system 30. Based on the received signal, the control system 30 may then map or associate an IP address to the MAC address of the motor of the neighboring track module 14, 16. Additional details regarding leveraging detection of a magnetic field at the set of coils of the motor of the track module 14, 16 to map or associate an IP address to the motor of the track module 14, 16 are described in more detail with reference to FIGS. 5, 8, and 9.

It should be noted that although the forgoing and following descriptions of various embodiments for mapping track modules are detailed with respect to MAC addresses, the embodiments described herein should not be limited to MAC addresses. Indeed, the present embodiments described herein may be applied to any suitable network address identifier, communication protocol, and the like.

Figure 2:
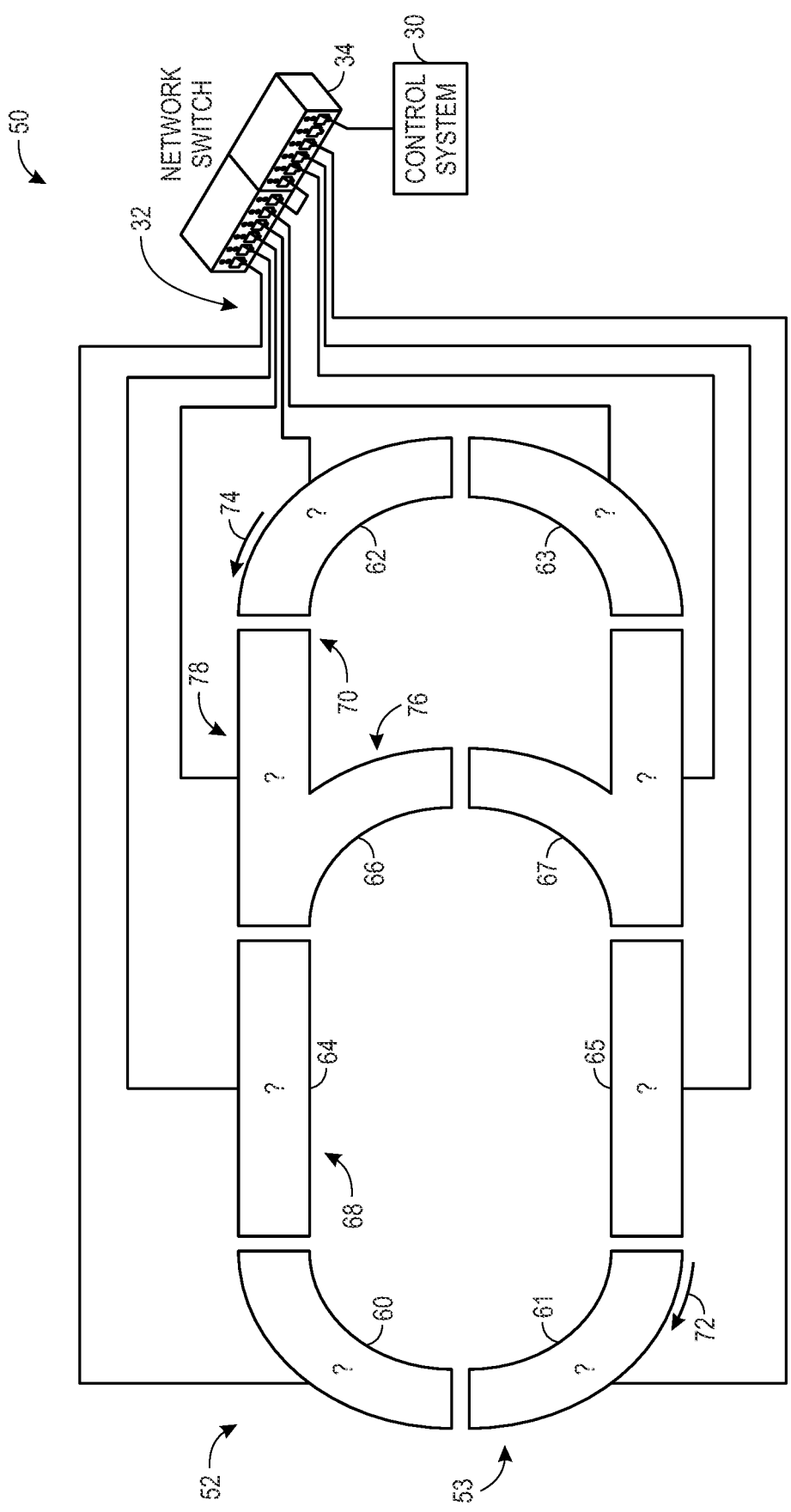
FIG. 2 illustrates a block diagram of an exemplary communication network including a linear motor system, a network switch, and a control system that may be employed by the industrial automation system of FIG. 1, in accordance with an embodiment.

As mentioned above, a track 12 of a linear motor system 10 may have multiple track modules 14, 16 mountable in various configurations. FIG. 2 illustrates a block diagram 50 of a linear motor system 52 having track modules 60, 61, 62, 63, 64, 65, 66, 67 mounted in an oval configuration with an inner path 68 and an outer path 70 of track 53. For example, the linear motor system 52 may include one or more movers (e.g., mover 18) mounted to and movable along the track provided by the track modules 60, 61, 62, 63, 64, 65, 66, 67. As illustrated in FIG. 2, the linear motor system 52 may include four curved track modules 60, 61, 62, 63, two straight track modules 64, 65, and two switch track modules 66, 67 that form the inner path 68 and the outer path 70 of the track 53. For instance, the inner path 68 of the track 53 may include the two curved track modules 60, 61, the two straight track modules 64, 65, and the two switch track modules 66, 67. The outer path 70 of the track 53 may include the four curved track modules 60, 61, 62, 63, the two straight track modules 64, 65, and the two switch track modules 66, 67. Additionally, the curved track modules 60, 61, 62, 63 and the two straight track modules 64, 65 may have respective motors that drive the mover along the respective portions of the inner path 68 and the outer path 70 of the track 53. The two switch track modules 66, 67 may have two or more respective motors that drive the mover along respective portions of the inner path 68 and the outer path 70 of the track 53. For instance, the switch track module 66 may have a first motor that may drive the mover along a first portion 76 of the inner path 68 and a second motor that may drive the mover along a first portion 78 of the outer path 70.

Each motor of each track module 60, 61, 62, 63, 64, 65, 66, 67 of the linear motor system 52 may have a unique identifier, a location identifier, and an orientation in the linear motor system 52. For instance, the unique identifier of a motor of a respective track module may include a MAC address, a serial number, a part type, a motor type, or a combination thereof. The location identifier of a motor of a respective track module may include a path identifier indicative of a particular path at least partially formed by the respective track module associated with the motor in the linear motor system 10. The location identifier of the motor may also include a motor identifier indicative of a relative location of the motor along the path partially formed by the respective track module in the linear motor system 52.

As illustrated in FIG. 2, the first motor of the switch track module 66 (e.g., the motor that drives the mover along the first portion 76 of the inner path 68) may have a path identifier indicative of the inner path (e.g., "path ID: 1") and a location identifier indicative of the position of the motor in a series of motors along the inner path 68 ("motor ID: 1"). Additionally, the second motor of the switch track 66 (e.g., the motor that drives the mover along the first portion 78 of the outer path 70) may have a path identifier indicative of the outer path 70 (e.g., "path ID: 2") and a location identifier indicative of the position of the motor in a series of motors along the outer path 70 (e.g., "motor ID: 1"). Each other motor along the inner path 68 and the outer path 70 may then have a subsequently numbered path identifier and motor identifier (e.g., the motor of curved track module 62 may have a "path ID: 2" and a "motor ID: 2", the motor of straight track module 65 may have a "path ID: 1" and a "motor ID: 3" and/or a "path ID: 2" and a "motor ID: 5", and so forth). Although the illustrated embodiment of FIG. 2 is described with reference to motors along the inner path 68 having a "path ID: 1" and motors along the outer path 70 having a "path ID: 2", it should be understood that in other embodiments, the motors along the outer path 70 may have a "path ID: 1" and motors along the inner path 68 may have a "path ID: 2". Similarly, the numbering of the location identifier of each motor along a respective path (e.g., inner path 68 or outer path 70) may begin at any motor along the respective path.

Further, each track module 60, 61, 62, 63, 64, 65, 66, 67 may have a particular orientation that the track module 60, 61, 62, 63, 64, 65, 66, 67 is disposed in the linear motor system 52. For instance, the straight track modules 64, 65 may be the same type of track module but oriented differently in the linear motor system 52 to form the track 53 of the linear motor system 52. As illustrated in FIG. 2, the straight track module 64 may have a "standard" orientation in the linear motor system 52 (e.g., the mover is driven along the straight track module 65 in the downstream direction 72 with respect to the linear motor system 52) or a "reversed" orientation in the linear motor system 52 (e.g., the mover is driven along the straight track module 65 in the upstream direction 74 with respect to the linear motor system 52). Although certain embodiments described herein are described with reference to movement around the track 53 in the downstream direction 72 as being clockwise around the track 53 and movement around the track 53 in the upstream direction 74 being counter-clockwise around the track 53, it should be understood that in other embodiments, movement in the downstream direction around the track 53 may be counter-clockwise around the track 53 and movement in the upstream direction around the track 53 may be clockwise around the track 53.

As illustrated in FIG. 2, each motor of each track module 60, 61, 62, 63, 64, 65, 66, 67 may communicate with the control system 30 over a communication network 32 via a network switch 34. For instance, the control system 30 may generally coordinate movement of a mover around the track 53 of the linear motor system 52 via the communication network 32 by transmitting respective commands to the motors of each track module 60, 61, 62, 63, 64, 65, 66, 67 of the linear motor system 52. In this way, the control system 30 may selectively energize and de-energize respective coils of one or more motors of the track modules 60, 61, 62, 63, 64, 65, 66, 67 to coordinate movement of the mover around the track 53. However, before communicating with the motors, the control system 30 may determine certain attributes associated with a motor of a track module 60, 61, 62, 63, 64, 65, 66, 67 to facilitate the communicate with the motor. For instance, the control system 30 may receive topology information associated with the linear motor system 10 from one or more computing devices (e.g., computing device 36) communicatively coupled to the control system 30. As mentioned above, the topology information may include an identifier of each motor of each track module 60, 61, 62, 63, 64, 65, 66, 67 in the linear motor system 52, an expected relative location of each motor of each track module 60, 61, 62, 63, 64, 65, 66, 67 in the linear motor system 52, and an orientation of each track module 60, 61, 62, 63, 64, 65, 66, 67 associated with each motor in the linear motor system 52. In certain embodiments, such topology information may be submitted via a commissioning tool GUI provided by the control system 30 to the computing devices. For example, the topology information may be included in a file created during commissioning of the linear motor system 52 and subsequently uploaded to the control system 30 via the commissioning tool GUI.

Based on the received topology information, the control system 30 may determine the identity of each motor of each track module 60, 61, 62, 63, 64, 65, 66, 67 in the linear motor system 52. For instance, the control system 30 may acquire information including the number of motors in the linear motor system 52, the number of paths provided by the track 53 of the linear motor system 52, the number of motors along each path provided by the track 53, one or more interconnections between each path provided by the track 53, and the like based on the topology information. However, in order to communicate with the motors of the track modules 60, 61, 62, 63, 64, 65, 66, 67 in the linear motor system 52, the control system 30 may assign a communication attribute (e.g., an IP address) to each motor of the track modules 60, 61, 62, 63, 64, 65, 66, 67. As described herein, the control system 30 may map or associate an IP address to the identifier (e.g., a MAC address) of each motor of the track modules 60, 61, 62, 63, 64, 65, 66, 67 via the communication network 32 in accordance with certain embodiments described herein. The control system 30 may then generate a configuration file based on the topology information associated with the linear motor system 52 and the IP address of each motor of the track modules 60, 61, 62, 63, 64, 65, 66, 67. After generating the configuration file, the control system 30 may transmit respective commands to the motors of each track module 60, 61, 62, 63, 64, 65, 66, 67 to coordinate movement of the mover around the track 53 based on the configuration file.

Additionally, each motor of each track module 60, 61, 62, 63, 64, 65, 66, 67 may communicate with each motor of each neighboring track module 60, 61, 62, 63, 64, 65, 66, 67 via the communication network 32. For instance, each motor of each track module 60, 61, 62, 63, 64, 65, 66, 67 may be communicatively coupled to each neighboring track module 60, 61, 62, 63, 64, 65, 66, 67 via a wired communication network 32 or a wireless communication network 32. In certain embodiments, the communication network 32 may be an Ethernet-based communication network.

Figure 3:
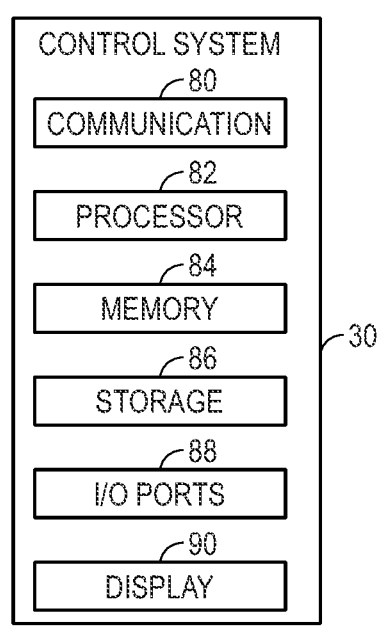
FIG. 3 illustrates a block diagram of the control system of FIGS. 1 and 2, in accordance with an embodiment.

To perform some of the actions set forth above, the control system 30 may include certain embodiments to facilitate these actions. FIG. 3 is a block diagram of example components within the control system 30. For example, the control system 30 may include a communication component 80, a processor 82, a memory 84, a storage 86, input/output (I/O) ports 88, a display 90, and the like. The communication component 80 may be a wireless or wired communication component that may facilitate communication between the control system 30 and the linear motor system 10, 52 (e.g., each motor of the track modules, the sensor system 22, and the like) via the network switch 34, the control system 30 and the computing devices 36, the control system 30 and the drive circuitry 26 via the power and control circuitry 28, and the like. Additionally, the communication component 80 may facilitate data transfer to the control system 30, such that the control system 30 may receive topology information and orientation information from the computing devices 36, receive signals from the linear motor system 10, 52, and the like.

The processor 82 may be any type of computer processor or microprocessor capable of executing computer-executable code. The processor 82 may also include multiple processors that may perform the operations described below. The memory 84 and the storage 86 may be any suitable articles of manufacture that can serve as media to store processor-executable code, data, or the like. These articles of manufacture may represent computer-readable media (e.g., any suitable form of memory or storage) that may store the processor-executable code used by the processor 82 to perform the presently disclosed techniques. The memory 84 and the storage 86 may also be used to store data, consumer models, various other software applications, and the like. The memory 84 and the storage 86 may represent non-transitory computer-readable media (e.g., any suitable form of memory or storage) that may store the processor-executable code used by the processor 82 to perform various techniques described herein. It should be noted that non-transitory merely indicates that the media is tangible and not a signal.

The I/O ports 88 may be interfaces that couple to other peripheral components such as input devices (e.g., keyboard, mouse), sensors, I/O modules, and the like. The display 90 may operate to depict visualizations associated with software or executable code being processed by the processor 82. In one embodiment, the display 90 may be a touch display capable of receiving inputs from a user of the control system 30. The display 90 may be any suitable type of display, such as a liquid crystal display (LCD), plasma display, or an organic light emitting diode (OLED) display, for example. Additionally, in one embodiment, the display 90 may be provided in conjunction with a touch-sensitive mechanism (e.g., a touch screen) that may function as part of a control interface for the control system 30.

It should be noted that the components described above with regard to the control system 30 are exemplary components and the control system 30 may include additional or fewer components as shown. Additionally, it should be noted that the computing devices 36 may also include similar components as described as part of the control system 30.

Figure 4:
FIG. 4 illustrates an exemplary commissioning tool graphical user interface (GUI) for generating a configuration file for a linear motor system, in accordance with an embodiment.

As mentioned above, the control system 30 may generate and transmit a commissioning tool GUI (e.g., visualization for display) to the computing devices 36 that may be used by an operator to automatically generate a configuration file associated with the linear motor system (e.g., the linear motor system 10, 52). For instance, after generating the configuration file, the control system 30 may transmit respective commands to the motors of each track module (e.g., the track modules 14, 16 or the track modules 60, 61, 62, 63, 64, 65, 66, 67) to coordinate movement of the mover around the track (e.g., the track 12 or the track 53) based on the configuration file. FIG. 4 illustrates an example visualization representative of a commissioning tool GUI 100 for automatically generating the configuration file associated with the linear motor system. An operator may submit topology information associated with the linear motor system 10, 52 into the commissioning tool GUI or upload the topology information, which may be used to populate the commissioning tool GUI. After the operator has submitted or uploaded the topology information (e.g., in a text file, an xml file, or the like), the control system 30 may automatically populate respective attribute fields in the commissioning tool GUI 100 with corresponding attribute values in the topology information.

As mentioned above, the topology information may include an identifier of each motor of each track module in the linear motor system 10, 52, a location identifier of each motor of each track module in the linear motor system 10, 52, and an orientation identifier of each track module associated with each motor in the linear motor system 10, 52. For instance, the identifier of a motor may include a MAC address, a serial number, a part type, a motor type, or a combination thereof. The location identifier of the motor may include a path identifier indicative of a particular path at least partially formed by the track module associated with the motor in the linear motor system 10, 52. The location identifier of the motor may also include a motor identifier indicative of the relative location of the motor along the path partially formed by the track module associated with the motor in the linear motor system 10, 52. The orientation identifier of the motor may indicate whether the track module associated with the motor has a "standard" orientation in the linear motor system 10, 52 or a "reversed" orientation in the linear motor system 10, 52. Based on the received topology information, the control system 30 may populate a path identifier field 102, a motor identifier field 104, an alternate path identifier field 106, an alternate motor identifier field 108, a motor type field 110, a MAC address field 112, an orientation field 116, and the like, in the commissioning tool GUI 100 with corresponding attribute values in the received topology information.

After populating respective fields (e.g., fields 102, 104, 106, 108, 110, 112, 116) associated with the motors in the commissioning tool GUI 100 based on the received topology information, the control system 30 may map or associate a communication attribute (e.g., an IP address) of each motor with the corresponding identifier (e.g., the MAC address) of the motor. In certain embodiments, the control system 30 may prompt the operator to manually scan the MAC address of each motor via a mobile device communicatively coupled to the control system 30 in a particular order based on the arrangement of the track modules. The control system 30 may then subsequently map or associate the IP address assigned to each motor to the MAC address of each motor. In this way, each motor may be accessed by the control system 30 by way of the IP address mapped to the MAC address of the respective motor. In other embodiments, the control system 30 may leverage detection of a magnetic field at respective sets of coils of each motor to map or associate the IP address assigned to each motor to the MAC address of each motor. In any case, after associating the IP address of each motor to the MAC address of each motor, the control system 30 may automatically populate respective IP address fields 114 in the commissioning tool GUI 100 with the assigned IP addresses of each motor.

After the control system 30 populates the IP address field 114 associated with each motor in the commissioning tool GUI 100, the operator may submit or upload additional orientation information for motors in the respective orientation fields 116 of the commissioning tool GUI 100 that were not automatically populated based on the received topology information. In some embodiments, the operator may directly enter attribute values in any of the respective attribute fields (e.g., 102, 104, 106, 108, 110, 112, 114) for a particular motor or override attribute values in the respective attribute fields that have been automatically populated by the control system 30. In any case, after the attribute fields associated with each motor of the linear motor system 10, 52 have been populated in the commissioning tool GUI 100, the control system 30 may generate a configuration file based on the respective attribute values populated in the attribute fields associated with each motor of the linear motor system 10, 52.

Figure 5:
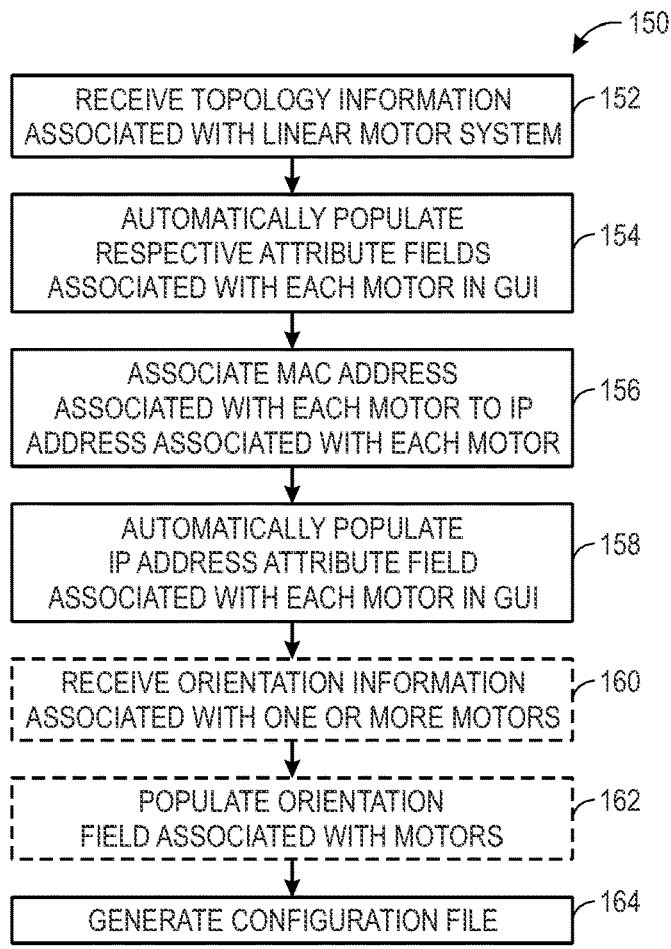
FIG. 5 illustrates a flowchart of a method for generating a configuration file for a linear motor system using the GUI of FIG. 4, in accordance with an embodiment.

With the foregoing in mind, FIG. 5 illustrates a flowchart of a method 150 for generating a configuration file after receiving topology information associated with a linear motor system 10, 52 and associating respective IP addresses assigned to each motor of the linear motor system 10, 52 with respective MAC addresses associated with the motors. Although the following description of the method 150 is described in a particular order, it should be noted that the method 150 is not limited to the depicted order, and instead, the method 150 may be performed in any suitable order. Moreover, although the method 150 is described as being performed by the control system 30, it should be noted that it may be performed by any suitable computing device.

As mentioned above, the control system 30 may transmit respective commands to the motors of each track module the linear motor system 10, 52 to coordinate movement of the mover around the track 12, 53. However, the control system 30 may first receive certain attributes associated with each motor of each track module to communicate with the motors. For instance, the control system 30 may receive the IP address of each motor to transmit commands to the motors over a communication network 32 (e.g., an Ethernet-based communication network). As such, the control system 30 may generate a configuration file based on topology information associated with the linear motor system 10, 52 received from one or more computing devices communicatively coupled to the control system 30 and each respective IP address assigned to each motor.

Keeping this in mind and referring now to FIG. 5, at block 152, the control system 30 may receive topology information associated with the linear motor system 10, 52. For example, the control system 30 may provide a commissioning tool GUI to a computing device 36, and an operator may input or upload the topology information via the commissioning tool GUI. In some embodiments, the topology information may be included within a text file, an XML file, or the like. Such a file may have been generated during commissioning of the linear motor system 10, 52.

As described above, the topology information may include an identifier of each motor of each track module in the linear motor system 10, 52, a location identifier of each motor of each track module in the linear motor system 10, 52, and an orientation identifier of each track module associated with each motor in the linear motor system 10, 52. For instance, the identifier of a motor may include a MAC address, a serial number, a part type, a motor type, or a combination thereof. The location identifier of the motor may include a path identifier indicative of a particular path at least partially formed by the track module associated with the motor in the linear motor system 10, 52. The location identifier of the motor may also include a motor identifier indicative of the location of the motor along the path partially formed by the track module associated with the motor in the linear motor system 10, 52. The orientation identifier of the motor may indicate whether the track module associated with the motor has a "standard" orientation in the linear motor system 10, 52 or a "reversed" orientation in the linear motor system 10, 52.

After receiving the topology information, at block 154, the control system 30 may automatically populate respective fields of the commissioning tool GUI with corresponding known attribute values associated with each motor of the linear motor system based on the topology information. For example, the populated fields in the commissioning tool GUI may include a path identifier field, a motor identifier field, an alternate path identifier field, an alternate motor identifier field, a motor type field, a MAC address field, an orientation field, and the like.

After the control system 30 has populated certain fields of the commissioning tool GUI based on the received topology information, at block 156, the control system 30 may map or associate one or more communication attributes (e.g., an IP address) of each motor with the corresponding identifier (e.g., the MAC address) of the motor. As described in more detail below, in certain embodiments, the control system 30 may prompt the operator to manually scan the MAC address of each motor via a mobile device communicatively coupled to the control system 30 in a particular order. The scanned MAC addresses may confirm an identity of a motor or track module with respect to its relative position in the linear motor system 10, 52. Using the scanned MAC addresses, the control system 30 may subsequently map or associate an IP address to each MAC address of each motor. In other embodiments, the control system 30 may leverage detection of a magnetic field at respective sets of coils of each motor to identify a relative location of each motor based on the MAC address of each motor and the corresponding detected magnetic field. In any case, the control system 30 may then associate an IP address to each motor to the MAC address of each motor. The IP address assigned to each motor may correspond to a particular order, arrangement, or position of the respective track module. After the IP addresses are assigned to the respective motors, at block 158, the control system 30 may automatically populate the respective IP address fields associated with each motor in the commissioning tool GUI with the assigned IP addresses of each motor.

At block 160, the control system 30 may optionally receive orientation information for one or more motors from the computing device 36 via the commissioning tool GUI 100. For instance, the operator may submit or upload additional orientation information for one or more motors to respective orientation fields 116 of the commissioning tool GUI 100 that were not automatically populated based on the received topology information. In some embodiments, each track module associated with a motor in the linear motor system 10, 52 may have a particular orientation that the track module is disposed in the linear motor system 10, 52. As discussed above, the track module may have a "standard" orientation in the linear motor system 10, 52 (e.g., a mover is driven along the track module in a downstream direction with respect to the linear motor system 10, 52) or a "reversed" orientation in the linear motor system 10, 52 (e.g., the mover is driven along the track module 65 in the upstream direction with respect to the linear motor system 10, 52). That is, certain types of track modules may be positioned within the linear motor system 10, 52 in different directions to provide the path formed by the track 12, 53 of the linear motor system 10, 52. For example, a straight track module may be used to drive a mover in a downstream direction along the track 12, 53, or the straight track module may be flipped and used to drive the mover in an upstream direction along the track 12, 53. A curved track module (e.g., having a ninety degree curve) may be disposed to provide a right turn in the track 12, 53 or a left turn in the track 12, 53. For example, a curved track module providing a right turn in the track 12, 53 may be associated with a "standard" orientation in the linear motor system 10, 52 and a curved track module providing a left turn in the track 12, 53 may be associated with a "reversed" orientation in the linear motor system 10, 52, or vice versa. In any case, if the orientation field for a particular motor in the commissioning tool GUI 100 was not automatically populated by the control system 30 based on the received topology information at block 154, the operator may submit such orientation information into the commissioning tool GUI 100.

At block 162, after receiving the orientation information from the computing device 36, the control system 30 may then populate or update the orientation field 116 of the commissioning tool GUI 100 based on the received orientation information. At block 164, the control system 30 may generate a configuration file based on the respective attribute values in the attribute fields associated with each motor of the linear motor system in the commissioning tool GUI 100. As mentioned above, the configuration file may include respective attributes that identify each motor of each track module in the linear motor system 10, 52, the location of each motor in the linear motor system 10, 52, the orientation of each track module associated with each motor in the linear motor system 10, 52, the MAC address of each motor in the linear motor system 10, 52, the internet protocol (IP) address associated with each motor in the linear motor system 10, 52, or a combination thereof. In this way, after generating the configuration file, the control system 30 may reference the configuration file for the IP address of a motor in order to transmit a command to the motor when coordinating movement of a mover over the track 12, 53 provided by the linear motor system 10, 52.

Figure 6:
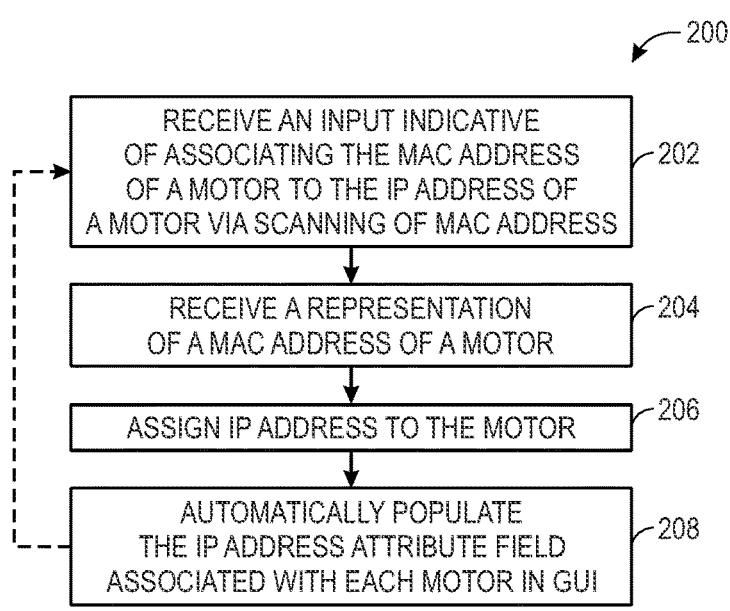
FIG. 6 illustrates a flowchart of a method for manually scanning or capturing network address information associated with each motor of the linear motor system and associating the network address information with an IP address assigned to each motor, in accordance with an embodiment.

As mentioned above, at block 156, the control system 30 may associate one or more communication attributes (e.g., an IP address) of each motor with the corresponding identifier (e.g., the MAC address) of the motor before generating the configuration file. In certain embodiments, the control system 30 may prompt the operator to manually scan the MAC address of each motor of the linear motor system 10, 52 via a mobile computing device 36 communicatively coupled to the control system 30 and subsequently map or associate the MAC address received from the mobile computing device 36. With the foregoing in mind, FIG. 6 illustrates a flowchart of a method 200 for manually scanning or capturing respective representations of the MAC addresses associated with each motor in the linear motor system 10, 52 and mapping or associating the MAC addresses to respective IP addresses assigned to each motor. Although the following description of the method 200 is described in a particular order, it should be noted that the method 200 is not limited to the depicted order, and instead, the method 200 may be performed in any suitable order. Moreover, although the method 200 is described as being performed by the control system 30, it should be noted that it may be performed by any suitable computing device.

At block 202, the control system 30 may receive an input indicative of associating a MAC address of a motor of the linear motor system 10, 52 with a respective IP address to be assigned to each motor. In one embodiment, the operator may select an option within the commissioning tool GUI 100 to provide the input to the control system 30 to start the process of manually scanning each MAC address of each motor. In another embodiment, the control system 30 may automatically prompt the operator to start the process of manually scanning each MAC address of each motor after the control system 30 has automatically populated respective fields of the commissioning tool GUI 100 based on the topology information received from a computing device 36 (e.g., at block 154 of FIG. 5). For instance, the control system 30 may transmit a command to the computing device 36 to display a notification via the commissioning tool GUI to begin manually scanning a first MAC address of the motor of the linear motor system, or the control system 30 may transmit a command to the mobile computing device 36 associated with the operator to begin manually scanning the first MAC address of the first motor of the linear motor system.

In any case, at block 204, the control system 30 may receive a representation of a MAC address associated with a first motor of the linear motor system 10, 52. For example, a representation of the MAC address for the motor may include a textual representation of the MAC address, a barcode indicative of the MAC address, a quick response (QR) code indicative of the MAC address, or the like, displayed on a suitable region of a track module associated with the motor or a suitable region of other components of the linear motor system 10, 52. An operator may scan, capture, or otherwise acquire the representation of the MAC address associated with the first motor using the mobile computing device 36, such as a smartphone, a tablet, a laptop, a barcode scanner, QR code reader, or the like.

After receiving the representation of the MAC address associated with the first motor, at block 206, the control system 30 may assign an IP address to the first motor, and, at block 208, the control system 30 may automatically populate the IP address attribute associated with the motor in the commissioning tool GUI 100. For example, based on the received representation of the MAC address associated with the first motor, the control system 30 may identify the corresponding IP attribute field associated with the first motor in the commissioning tool GUI 100. The control system 30 may then update the corresponding IP attribute field in the commissioning tool GUI 100 to indicate the assigned IP address. In one embodiment, the control system 30 may assign a static IP address to the first motor that persists regardless of the first motor being communicatively connected to the communication network 32. In another embodiment, the control system 30 may assign a dynamic IP address to the first motor that may be reassigned to a different motor should the first motor be replaced or removed from the linear motor system 10, 52.

After the control system 30 has populated the IP address attribute associated with the first motor in the commissioning tool GUI 100, the control system 30 may optionally repeat the steps of blocks 202 to 208 until the control system 30 has assigned an IP address to each motor of the linear motor system 10, 52 and associated the assigned IP addresses to the MAC addresses of the motors by populating the IP address attribute fields associated with the motors in the commissioning tool GUI 100. After the control system 30 has populated the IP address attribute fields associated with each motor of the linear motor system 10, 52 in the commissioning tool GUI, the control system 30 may optionally perform the steps at blocks 160 and 162 described above with reference to FIG. 5 before proceeding to generate the configuration file at block 164.

Figure 7A:
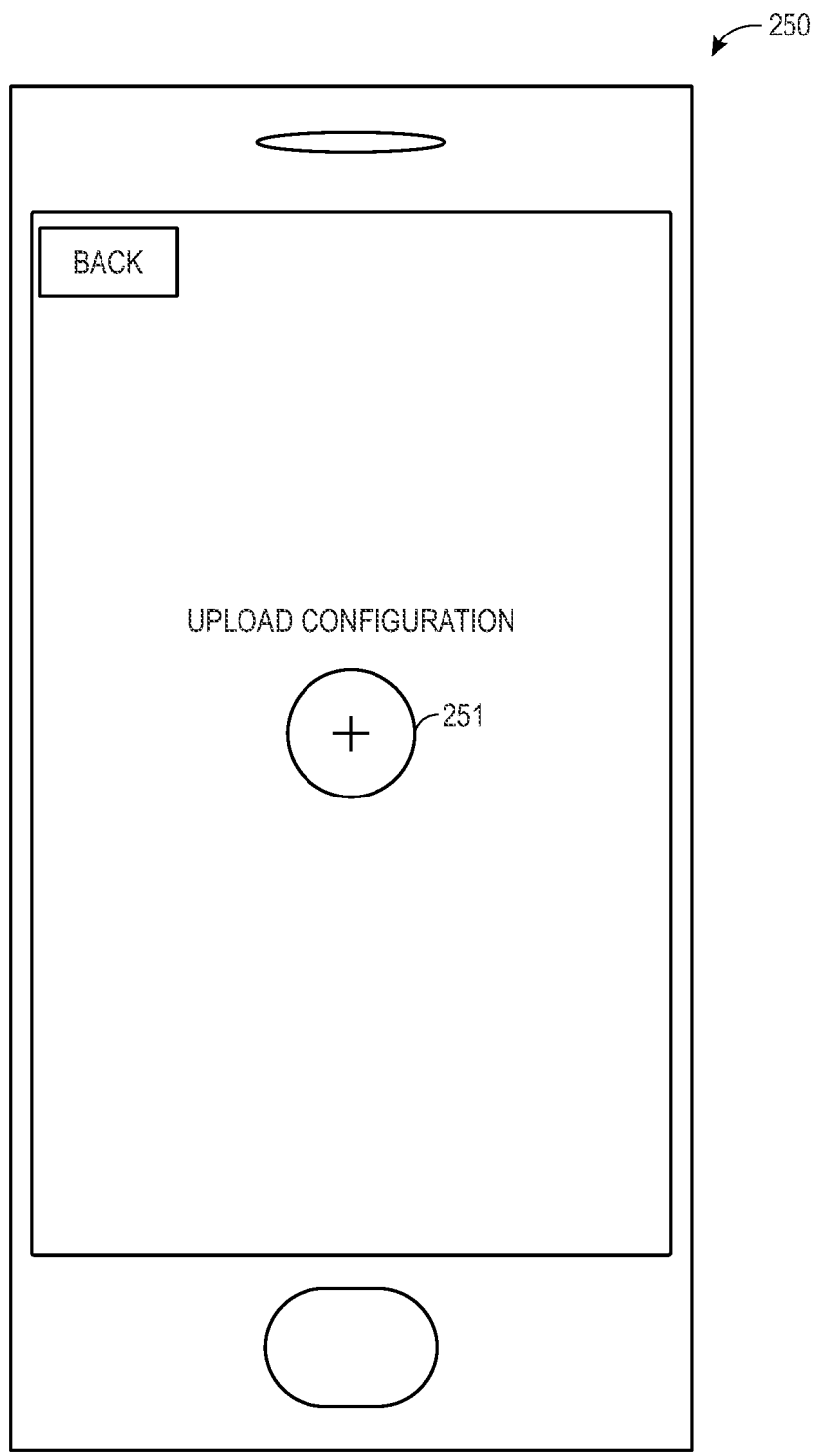
FIG. 7A illustrates a first representation of an exemplary GUI for manually scanning or capturing network address information of a motor to be associated with an IP address assigned to the motor, in accordance with an embodiment.
Figure 7B:
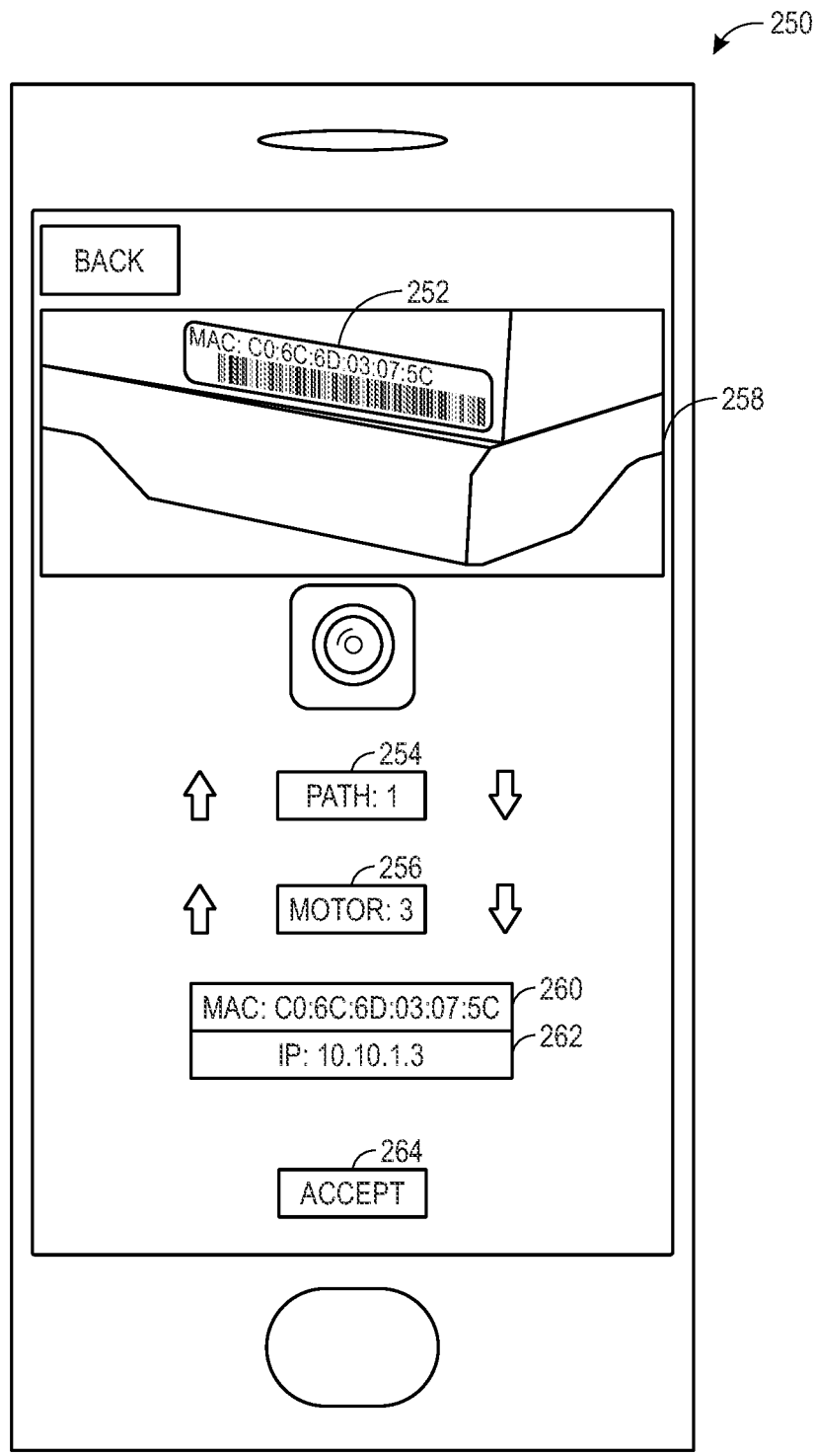
FIG. 7B illustrates a second representation of the exemplary GUI of FIG. 7A, in accordance with an embodiment.

With the foregoing in mind, FIGS. 7A and 7B illustrate a GUI 250 of a mobile device application that may be utilized by the operator to manually scan or capture the MAC address of each motor in the linear motor system 10, 52. FIG. 7A illustrates the GUI 250 that may be displayed on a mobile computing device 36 that includes a selectable option 251 that may initialize the process of manually scanning a MAC address of a particular motor in the linear motor system 10, 52. For example, the control system 30 may receive an input indicative of a selection of the option 251 and listen or become prepared to receive subsequent inputs from the mobile computing device 36 identifying the particular motor associated with the MAC address to be scanned by the mobile computing device 36.

FIG. 7B illustrates the GUI 250 after the operator has selected the option 251 in the GUI 250 illustrated in FIG. 7A. Although FIGS. 7A and 7B are described herein as a sequence of representations of the GUI 250 displayed by the mobile computing device 36, it should be understood that in some embodiments, the GUI 250 may directly display the GUI 250 illustrated in FIG. 7B without first receiving the selection of the option 251 in the GUI 250 illustrated in FIG. 7A. Referring now to FIG. 7B, the GUI 250 may display a path identifier field 254 and a motor identifier field 256 that allows the operator to specify the identity of the motor associated with the MAC address that is to be acquired by the mobile computing device 36. For instance, before the operator scans or captures the physical MAC address 252 displayed on a suitable region of the track module associated with the motor or another suitable region of the linear motor system, the operator may input the path identifier attribute associated with the motor in the path identifier field 254 in the GUI 250 and the motor identifier attribute associated with the motor in motor identifier field 256 in the GUI 250. In this way, the control system 30 may quickly and accurately identify the respective fields (e.g., the MAC address field and the IP address field) associated with the motor in the commissioning tool GUI 100 to populate based on the received representation of the physical MAC address 252 from the mobile computing device 36.

After the operator has specified the corresponding path identifier attribute and the corresponding motor identifier attribute associated with the motor, the operator may scan or capture the physical MAC address 252 associated with the motor using the mobile computing device 36. As mentioned above, the mobile computing device 36 may include a smartphone, a tablet, a laptop, a barcode scanner, QR code reader, or the like. As illustrated in FIG. 7B, the GUI 250 may present an image 258 of the region of the track module or linear motor system 10, 52 upon which the physical MAC address 252 is displayed. After the mobile computing device 36 has acquired an image of the physical MAC address 252, or a representation thereof, the mobile computing device 36 may process the image or representation and populate a MAC address field 260 with the corresponding MAC address in the GUI 250. In some embodiments, the MAC address populated in the MAC address field 260 may be edited by the operator (e.g., if the populated MAC address does not correspond to the physical MAC address 252). In other embodiments, the MAC address field 260 may be fixed such that the operator may rescan or recapture the MAC address to edit the populated MAC address in the MAC address field 260.

After the acquired MAC address associated with the motor has been populated in the MAC address field 260, the control system 30 may receive the acquired MAC address from the mobile computing device 36. In some embodiments, the mobile computing device 36 may transmit the acquired MAC address to the control system 30 at substantially the same time as the mobile computing device 36 is populating the MAC address field 260 with the MAC address. In any case, the control system 30 may assign the motor an IP address after receiving the MAC address associated with the motor and transmit an indication of the assigned IP address to the mobile computing device 36. After the mobile computing device 36 has received the assigned IP address, the mobile computing device 36 may automatically populate an IP address field 262 of the GUI 250.

In some embodiments, the control system 30 may automatically populate the corresponding IP address field in the commissioning tool GUI 100 after assigning the motor the IP address. In other embodiments, the control system 30 may populate the corresponding IP address field after receiving an input (e.g., via selection of option 264) from the mobile computing device indicative of a confirmation by the operator that the information submitted and/or populated in the GUI 250 is correct. In any case, the operator may utilize the GUI 250 to specify additional motors (e.g., via the path identifier field 254 and the motor identifier field 256) associated with respective MAC identifiers to be acquired by the mobile computing device 36. In this way, the control system 30 may assign additional IP addresses for the additional motors after receiving the scanned or captured representations of the MAC addresses of the additional motors.

Figure 8:
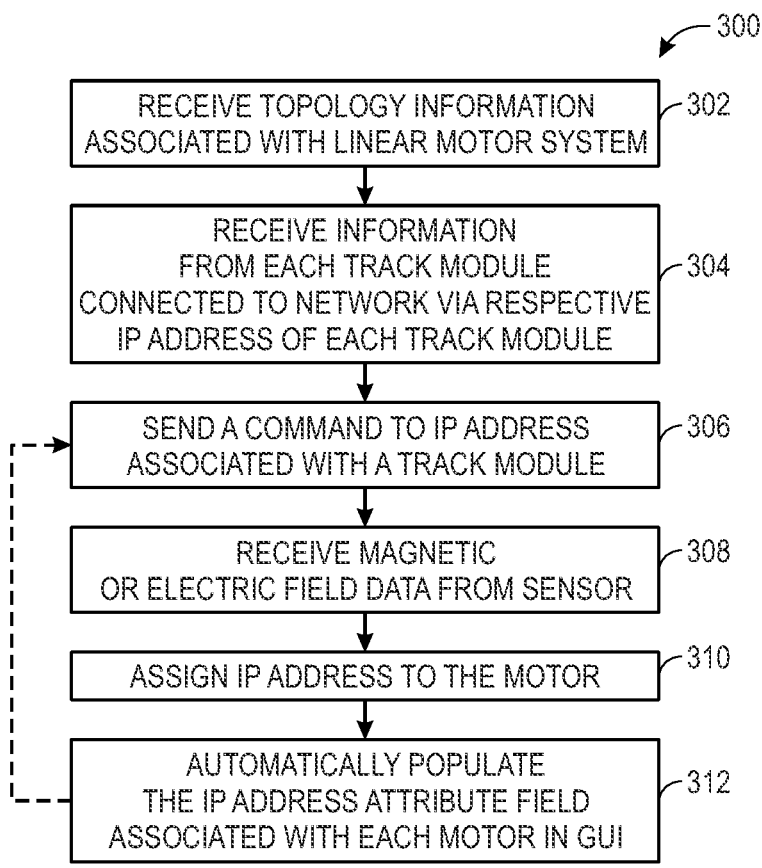
FIG. 8 illustrates a flowchart for automatically for detecting a magnetic field associated with an energized motor and assigning the energized motor an IP address to be associated with a MAC address of the energized motor, in accordance with an embodiment.

In order to reduce the time and manual effort used in generating the configuration file, in certain embodiments, the control system 30 may leverage detection of a magnetic field at respective sets of coils of each motor to automatically map and associate IP addresses to be assigned to each motor to the MAC addresses of each motor in the linear motor system 10, 52. With the foregoing in mind, FIG. 8 illustrates a flowchart of a method 300 for detecting a magnetic field at a set of coils associated with an energized motor and assigning the energized motor an IP address to be associated with a MAC address of the energized motor. Although the following description of the method 300 is described in a particular order, it should be noted that the method 300 is not limited to the depicted order, and instead, the method 300 may be performed in any suitable order. Moreover, although the method 300 is described as being performed by the control system 30, it should be noted that it may be performed by any suitable computing device.

At block 302, the control system 30 may receive topology information associated with the linear motor system 10, 52. For instance, the topology information may describe a particular order, arrangement, or position of each track module in the linear motor system 10, 52. In certain embodiments, such topology information may be received by the control system at block 152 of the method 150 illustrated in FIG. 5. After receiving the topology information, the control system 30 may receive a respective communication from each track module in the linear motor system 10, 52 after the track modules have powered on and connected to the communication network 32. For example, the communications may be received from respective IP addresses associated with the track modules that have connected to the communication network 32. In certain embodiments, such IP addresses may have been dynamically assigned to each track module upon connection to the communication network 32 or pre-defined for each track module. Each communication may indicate to the control system 30 that the respective track module of the linear motor system 10, 52 has connected to the communication network 32. In this way, the control system 30 may identify the track modules of the linear motor system 10, 52 that are available in the linear motor system 10, 52, such that respective desired IP addresses may be assigned to each identified track module in the configuration file.

At block 306, the control system 30 may send a command to a first track module via the IP address assigned to the track module at block 304. For instance, the control system 30 may transmit a signal to a first track module via the communication network 32 to identify each motor associated with the track module. In one embodiment, the control system 30 may prompt the operator to manually move a mover over a first track module of the linear motor system 10, 52. As the mover traverses the linear motor system 10, 52, each motor associated with the first track module may receive a magnetic field generated from a corresponding magnet array of the mover. A sensor (e.g., a magnetic field sensor, a voltage sensor, or an electric field sensor) associated with the traversed track module may then detect the generated magnetic field and send a signal to the control system 30 indicative of the detected magnetic field (e.g., magnetic or electric field data).

In another embodiment, the control system 30 may automatically drive the mover over each track module in the linear motor system 10, 52. For instance, after a mover has been placed on a first track module of the linear motor system 10, 52, the control system 30 may transmit a command to the first track module to energize one or more respective sets of coils associated with the first track module. As the mover traverses each motor of the first track module, the magnetic field generated by the mover is affected by the traversal of the mover over the motor. A sensor (e.g., a magnetic field sensor, a voltage sensor, or an electric field sensor) associated with the traversed track module may then detect the generated magnetic field and send a signal to the control system 30 indicative of the detected magnetic field (e.g., magnetic or electric field data).

Alternatively, the control system 30 may transmit a command to a track module to energize a set of coils associated with the track module without driving the mover. For instance, each track module of the linear motor system 10, 52 may have a set of coils disposed proximate to a sensor (e.g., a magnetic field sensor or a voltage sensor) within an adjacent end of a neighboring track module. After a particular track module energizes a set of coils to produce a magnetic field in response to received command from the control system 30, the sensor within the neighboring track module may detect the generated magnetic field and transmit a signal to the control system 30 indicative of the detected magnetic field (e.g., magnetic or electric field data).

After receiving the signal indicative of the magnetic field at block 308, the control system 30 may automatically assign a desired IP address to the energized motor or the motor associated with the energized coils at block 310. For instance, the control system 30 may reference the received topology information to determine the identity of the motor based on the identity and the position of the track module and the received signal (e.g., the position of the motor with respect to the sensor that transmitted the signal). In this way, the control system 30 may determine the order, arrangement, or position of the motor with respect to other motors in the linear motor system 10, 52.

In certain embodiments, the control system 30 may assign the IP address to the motor based on a list of pre-defined IP addresses or numerically ordered IP addresses. For instance, the control system 30 may assign the next available IP address in the list to the motor. In other embodiments, the IP address assigned to the motor may be based on a randomly generated IP address. In any case, the IP address assigned to the motor may be any suitable IP address compatible with the communication network 32. After assigning the IP address to the motor at block 310, the control system 30 may automatically populate the IP address field associated with the motor in the commissioning tool GUI 100 with the assigned IP address.

With regard to each of the respective embodiments described above, the control system 30 may optionally repeat the steps of blocks 306 to 312 until the control system 30 has assigned an IP address to each motor of the linear motor system 10, 52 and associated the assigned IP addresses to the MAC addresses of the motors by populating the IP address attribute fields associated with the motors in the commissioning tool GUI 100. After the control system 30 has populated the IP address attribute fields associated with each motor of the linear motor system 10, 52 in the commissioning tool GUI 100, the control system 30 may optionally perform the steps at blocks 160 and 162 described above with reference to FIG. 5 before proceeding to generate the configuration file at block 164.

Although embodiments herein are described with reference to the controls system 30 associating an IP address assigned to each motor of a linear motor system 10, 52 to respective MAC addresses associated with each motor, it should be understood that similar techniques may be performed by the control system 30 to associate an IP address assigned to a motor replacing an existing motor of the linear motor system 10, 52. For example, a particular motor of the linear motor system 10, 52 may be replaced with a new motor due to a maintenance issue. The control system 30 may assign the new motor an IP address, associate the assigned IP address with the MAC address of the new motor, and update the configuration file associated with the linear motor system 10, 52 with the IP address, the MAC address, and other attributes of the new motor in accordance with embodiments described herein.

Technical effects of the present disclosure include techniques for automatically identifying components of a linear motor system (e.g., motors, track modules, and the like) in an industrial system, assigning IP addresses to the identified components, and generating a configuration file associated with the linear motor system. After the configuration file has been generated, a control system may use the configuration file to coordinate operation of the components of the linear motor system for various industrial applications. By automatically generating the configuration file in accordance with one or more embodiments described herein, the time and the effort spent generating the configuration file is reduced in comparison to manually creating the configuration file. Additionally, the configuration file may increase the accuracy and certainty of identification and control over the components of the linear motor system by the control system. Further, by detecting magnetic fields by one or more sensors of the track modules and converting the signals received from the track modules to automatically identify respective motors of the track modules, the techniques described herein may reduce the amount of data transmitted via a communication network and the frequency of transmitted data via the communication network when generating the configuration file.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A non-transitory, computer-readable medium, comprising computer-executable code that, when executed by at least one processor, causes the at least one processor to perform operations comprising:
 receiving topology information associated with a linear motor system comprising a plurality of track modules, wherein each track module of the plurality of track modules comprises one or more motors associated with the track module;
 automatically populating a configuration file with one or more attribute fields with one or more respective attributes associated with each motor of the one or more motors based on the topology information, wherein the one or more respective attributes associated with each motor of the one or more motors comprises an identifier associated with a respective motor of the one or more motors;
 associating one or more communication attributes of each motor of the one or more motors with the respective identifier of the motor, wherein associating the one or more communication attributes with the respective identifier of the motor comprises:
  receiving a signal from a sensor associated with a track module of the plurality of track modules, wherein the signal is indicative of a magnetic field associated with the motor; and
  assigning a first communication attribute of the one or more communication attributes to the motor based on the signal;
 automatically populating the configuration file with one or more respective communication attribute fields associated with the one or more motors based on the one or more communication attributes; and
 transmitting one or more commands to the one or more motors to control one or more respective operations based on the configuration file.

2. The non-transitory, computer-readable medium of claim 1, wherein the magnetic field is generated in response to a mover traversing a second track module of the plurality of track modules adjacent to the motor.

3. The non-transitory, computer-readable medium of claim 1, wherein associating the one or more communication attributes with the respective identifier comprises assigning an internet protocol (IP) address to the motor.

4. The non-transitory, computer-readable medium of claim 1, wherein the one or more communication attributes are associated with an Ethernet-based network.

5. The non-transitory, computer-readable medium of claim 1, wherein the one or more respective attributes comprise one or more respective media access control (MAC) addresses associated with the one or more motors.

6. A system, comprising:
 a linear motor system, comprising a plurality of track modules, wherein each track module of the plurality of track modules comprises one or more motors associated with the track module;
 a control system, comprising:
  one or more processors; and
  a memory, accessible by the one or more processors, storing instructions that, when executed by the one or more processors, cause the one or more processors to perform operations comprising:
   receiving topology information associated with the linear motor system;
   automatically populating a configuration file with one or more attribute fields with one or more respective attributes associated with each motor of the one or more motors based on the topology information, wherein the one or more respective attributes associated with each motor of the one or more motors comprises an identifier associated with a respective motor of the one or more motors;
   associating one or more communication attributes of each motor of the one or more motors with the respective identifier of the motor, wherein associating the one or more communication attributes with the respective identifier of the motor comprises:
transmitting a command to the one or more motors to generate a magnetic field to cause a mover to move across the plurality of track modules;
receiving a signal from a sensor associated with a first motor of the one or more motors, wherein the signal is indicative of the mover moving across the first motor; and
assigning a first communication attribute of the one or more communication attributes to the first motor based on the signal;
automatically populating the configuration file with one or more respective communication attribute fields associated with the one or more motors based on the one or more communication attributes; and
transmitting one or more commands to the one or more motors to control one or more respective operations based on the configuration file.

7. The system of claim 6, wherein the one or more communication attributes comprise an internet protocol (IP) address.

8. A method, comprising:
receiving, via a processor, topology information associated with a linear motor system comprising a plurality of track modules, wherein each track module of the plurality of track modules comprises one or more motors associated with the track module;
automatically populating, via the processor, a configuration file with one or more attribute fields with one or more respective attributes associated with each motor of the one or more motors based on the topology information, wherein the one or more respective attributes associated with each motor of the one or more motors comprises an identifier associated with a respective motor of the one or more motors;
associating, via the processor, one or more communication attributes of each motor of the one or more motors with the respective identifier of the motor, wherein associating the one or more communication attributes with the respective identifier of the motor comprises:
transmitting a command to a first motor of the one or more motors to energize a set of coils associated with the first motor;
receiving a signal from a sensor associated with the first motor, wherein the signal is indicative of a magnetic field generated by the set of coils; and
assigning a first communication attribute of the one or more communication attributes to the first motor based on the signal;
automatically populating the configuration file with one or more respective communication attribute fields associated with the one or more motors based on the one or more communication attributes; and
transmitting one or more commands to the one or more motors to control one or more respective operations based on the configuration file.

9. The method of claim 8, comprising receiving orientation information associated with the first motor, and wherein the configuration file is populated based on the topology information and the orientation information.

10. A method, comprising:
receiving, via a processor, topology information associated with a linear motor system comprising a plurality of track modules, wherein each track module of the plurality of track modules comprises one or more motors, and wherein the topology information comprises one or more media access control (MAC) addresses associated with the one or more motors;
associating one or more IP addresses with the one or more MAC addresses associated with the one or more motors, wherein associating the one or more IP addresses with the one or more MAC addresses comprises:
receiving a signal from a sensor associated with a track module of the plurality of track modules, wherein the signal is indicative of a magnetic field associated with a first motor of the one or more motors; and
assigning an IP address of the one or more IP addresses to the first motor based on the signal;
generating a configuration file associated with the linear motor system based on the topology information and the one or more IP addresses; and
transmitting one or more commands to the one or more motors to control or adjust one or more operations of the one or more motors based on the configuration file.

11. The method of claim 10, wherein associating the one or more IP addresses of the one or more motors with the one or more MAC addresses associated with the one or more motors comprises receiving a representation of a particular MAC address of the one or more MAC addresses, wherein the representation comprises text indicative of the particular MAC address, a barcode indicative of the particular MAC address, a quick response (QR) code indicative of the particular MAC address, or a combination thereof.

12. The method of claim 10, comprising receiving orientation information associated with the first motor, and wherein the configuration file is generated based on the topology information, the one or more IP addresses, and the orientation information.

13. The method of claim 10, wherein the topology information comprises location information associated with the one or more motors in the linear motor system, orientation information associated with the plurality of track modules in the linear motor system, or both.

14. The method of claim 10, comprising receiving the configuration file from a computing device configured to generate the configuration file based on one or more inputs in a graphical user interface associated with the linear motor system.

15. The method of claim 14, comprising automatically populating, via the graphical user interface, respective attribute fields associated with the one or more motors with respective attributes associated with the one or more motors based on the topology information.

16. The method of claim 14, comprising automatically populating, via the graphical user interface, respective IP address fields associated with the one or more motors with the one or more IP addresses associated with the one or more motors.

17. The method of claim 10, wherein the operations comprise receiving orientation information associated with a particular motor of the one or more motors.

18. The method of claim 17, wherein the orientation information is indicative of a direction of movement that a mover is configured to traverse the track module associated with the particular motor in the linear motor system.

19. The method of claim 10, wherein the configuration file comprise respective path identifier fields associated with the one or more motors, respective motor identifier fields associated with the one or more motors, respective motor type fields associated with the one or more motors, respective orientation fields associated with respective track modules of the plurality of track modules associated with the one or more motors, or a combination thereof.

20. The method of claim 10, wherein the magnetic field is generated in response to a mover traversing a second track module of the plurality of track modules adjacent to the first motor.

* * * * *